(No Model.)

E. A. GERRARD & S. T. HILL.
NUT LOCK.

No. 249,034. Patented Nov. 1, 1881.

WITNESSES:
Fred G. Dieterich
John C. Kenson

INVENTOR:
E. A. Gerrard
S. T. Hill
BY
ATTORNEYS.

N. PETERS, Photo-Lithographer, Washington, D. C.

UNITED STATES PATENT OFFICE.

EDWARD A. GERRARD AND SAMUEL T. HILL, OF COLUMBUS, NEBRASKA.

NUT-LOCK.

SPECIFICATION forming part of Letters Patent No. 249,034, dated November 1, 1881.

Application filed May 7, 1881. (No model.)

*To all whom it may concern:*

Be it known that we, EDWARD A. GERRARD and SAMUEL T. HILL, of Columbus, in the county of Platte and State of Nebraska, have invented a new and useful Improvement in Nut-Locks; and we do hereby declare that the following is a full, clear, and exact description of the same, reference being had to the accompanying drawings, forming part of this specification, in which—

Figure 1:
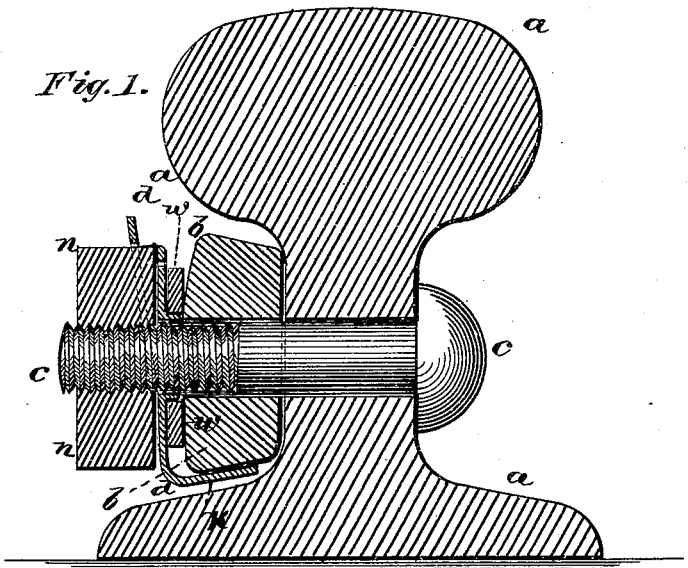
Figure 2:
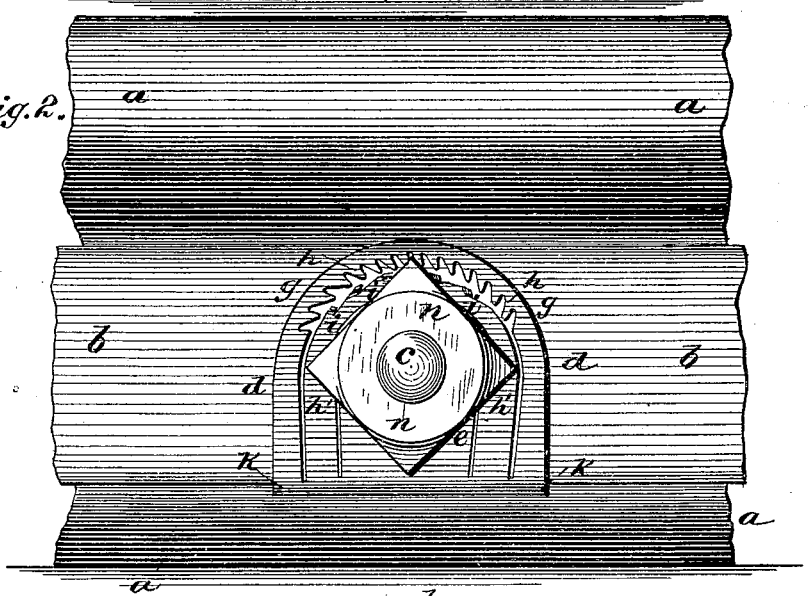
Figure 3:
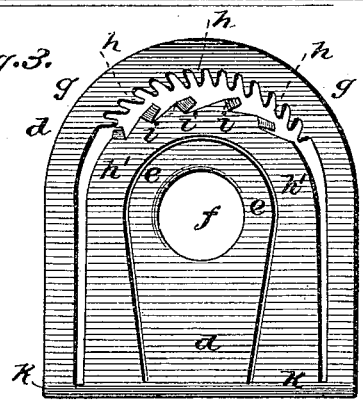

Figure 1 is a central vertical section of our improved nut-lock. Fig. 2 is a front elevation of the same, and Fig. 3 is a detail view of the spring-plate.

Our invention relates to improvements in nut-locks; and it consists of a locking-plate provided with one or more arcs of circles formed in the locking-plate and provided with teeth or notches, the arc or arcs being adapted to spring out and their teeth to engage with the nut, as hereinafter more fully set forth.

In the accompanying drawings we have shown our nut-lock as applied to a fish-plate and railroad-rail, though obviously it can be used elsewhere, in which $a$ represents a railroad-rail, $b$ a fish-plate, and $c$ a bolt, screw-threaded at one end, passing through holes in the rail and fish-plate, and provided with a nut, $n$, and washer $w$, either above or below the locking-plate, preferably outside the plate, between it and the nut.

$d$ represents a locking-plate provided with a central orifice, $f$, for the passage of the bolt. This orifice is provided with a circular rim, $e$, surrounding the orifice, which is to prevent the edge of the orifice from engaging with the thread of the bolt.

$g$ represents an outer spring-arc of a circle, cut out of the locking-plate and provided with notches or teeth $h$ on its inner edge. The arc $g$, when not held down by the wrench in screwing on or unscrewing the nut $n$, is adapted to spring outward, the teeth catching the corners of the nut and preventing it from turning.

$h'$ represents an inner spring-arc, cut out of the locking-plate and concentric with the outer arc, $g$. The upper part of the inner spring-arc, $h'$, is provided with ratchet-teeth $i$, cut out along the upper edge of the arc and inclined outwardly, so that the corners of the nut, as it revolves, will ride up the teeth, pressing the spring-arc inwardly, the washer $w$ lying between the locking-plate and fish-plate, and having a smaller radius than the spring-arc $h'$, so that when the nut is screwed home the inner arc, $h'$, will spring outwardly, its teeth engaging with the lower part of the nut, to prevent it from turning backward and the nut from unscrewing.

By this construction of a locking-plate a double lock is made, the teeth on both the inner and outer arcs locking the nut and preventing it from turning backward. The lower part of the locking-plate $d$ is provided with a flange, $k$, lying under the lower edge of the fish-plate or part to be bolted, to prevent the locking-plate from turning.

In the construction above described, in which two spring-arcs provided with teeth are employed, the washer $w$, of less radius than the inner spring-arc and lying between the locking-plate and fish-plate and concentric with the spring-arc, allows a play of the inner spring-arc back and forth, so that the inner arc gives as the nut is screwed on, and when the nut is screwed home the inner arc springs outwardly and its teeth spring into place, and engages with the nut to prevent it from turning back.

What we claim as our invention is—

1. The combination, with a threaded bolt, $c$, nut $n$, and washer $w$, of a locking-plate, $d$, provided with the outer spring-arc, $g$, having teeth $h$, and inner spring-arc, $h'$, provided with ratchet-teeth $i$, substantially as described, and for the purpose set forth.

2. The locking-plate $d$, provided with a central orifice, $f$, flange $e$, outer spring-arc, $g$, having teeth $h$, and inner spring-arc, $h'$, provided with ratchet-teeth $i$, substantially as described, and for the purpose set forth.

EDWARD A. GERRARD.
SAMUEL T. HILL.

Witnesses:
HENRY SUBKER,
M. E. BITTNER.